US006530739B1

(12) United States Patent
Fridman

(10) Patent No.: US 6,530,739 B1
(45) Date of Patent: Mar. 11, 2003

(54) VEHICLE MOUNTED FORKLIFT MOUNTING SYSTEM AND A FORKLIFT AND CARRIER USING THE SAME

(76) Inventor: Boris Fridman, 525 Maywood Rd., York, PA (US) 17402-4155

( * ) Notice: Subject to any disclaimer, the term of this patent is extended or adjusted under 35 U.S.C. 154(b) by 0 days.

(21) Appl. No.: 09/660,391

(22) Filed: Sep. 12, 2000

(51) Int. Cl.[7] .................................................. B60P 3/00
(52) U.S. Cl. ...................................... 414/467; 414/462
(58) Field of Search ................................ 414/462, 467, 414/343, 347, 539, 540

(56) References Cited

U.S. PATENT DOCUMENTS 3,799,379 A * 3/1974 Grether et al. .............. 214/515
4,266,795 A * 5/1981 Walker ....................... 280/402
4,396,341 A * 8/1983 Brouwer et al. ............ 414/467
4,411,329 A * 10/1983 Stedman ..................... 180/7 R
4,619,579 A 10/1986 Frison
5,439,152 A * 8/1995 Campbell ................... 224/405
5,549,437 A * 8/1996 Kishi ......................... 414/462
5,575,604 A * 11/1996 Dubosh et al. ............. 414/462
5,749,695 A 5/1998 Moffett et al.
5,813,820 A 9/1998 Dubosh et al.
5,876,175 A 3/1999 Braud
6,024,535 A 2/2000 Dubosh et al.
6,059,330 A * 5/2000 Moffett et al. .............. 293/118
6,062,800 A * 5/2000 Perry et al. ................. 414/462

* cited by examiner

*Primary Examiner*—Kathy Matecki
*Assistant Examiner*—Charles Fox
(74) *Attorney, Agent, or Firm*—Nixon Peabody LLP; Daniel S. Song

(57) ABSTRACT

An improved mounting system for mounting a forklift on a carrier vehicle where the forklift includes a frame, a mast connected to the frame, and a fork carriage having a pair of forks extending therefrom. The fork carriage is adapted to be vertically displaceable on the mast and laterally extendable relative to the mast. The carrier vehicle includes a mounting end with at least one fork receiver adapted to receive the pair of forks therein and to allow complete lifting of the forklift off of a ground surface by vertically displacing the fork carriage. At least one hook is attached to either the mast of the forklift or the mounting end of the carrier vehicle, and an engagement bar is secured to the other of the mast or the mounting end. The engagement bar is sized to be received within the at least one hook to thereby securely mount the forklift to the mounting end of the carrier vehicle. In one embodiment the at least one hook is two hooks rigidly attached to base portions of the mast. In another embodiment, the engagement bar is adapted to be laterally extendable from the mounting end.

18 Claims, 6 Drawing Sheets

VEHICLE MOUNTED FORKLIFT MOUNTING SYSTEM AND A FORKLIFT AND CARRIER USING THE SAME

BACKGROUND OF THE INVENTION

1. Field of the Invention

The present invention is related to the field of fork lifts and fork lift carrier vehicles. More specifically, the invention relates to a mounting system for mounting a vehicle mounted forklift on a carrier vehicle.

2. Description of Related Art

In industry, forklifts are frequently used to load and unload stacked pallets of products from tractor trailers that transport the pallets of products to the desired location. In certain situations, a forklift may not be available at a particular location for unloading the tractor trailer. Of course, a forklift may also be transported to the desired location together with the tractor trailer so as to eliminate such a problem of unloading. However, sending a transport vehicle with a forklift adds additional expense to the total cost of transporting the pallets of products to the desired location. One alternative is to have the tractor trailer transporting the pallets of products transport the forklift to the desired location as well. However, transporting the forklift on the bed of the trailer is not desirable because it takes up much need room on the bed thereby reducing the capacity for transporting the pallets of products.

In response, various mounting systems and methods have been devised for transporting the forklift so that it can be transported to the desired location without reducing the capacity for transporting the pallets of products on the bed of the trailer. U.S. Pat. No. 4,266,795 to Walker discloses a forklift towing structure including a pair of pivotable levers attached to a base of a mast that is used engage a crossbar on the trailer thereby allowing the forklift to be towed by the trailer. However, the forklift towing structure disclosed in Walker has been found to be an inadequate solution for a variety of reasons. First, the towing structure of Walker requires a hydraulic cylinder to actuate the pivotable lever and to lift the front wheels of the forklift. Of course, such added mechanisms substantially increases the cost of the forklift. In addition, because the pair of pivotable levers are mechanically hinged, the bushings of the levers invariably have tolerances and wear rapidly due to the heavy weight placed thereon. Moreover, the forklift is often unstable when towed since it lacks a suspension suitable for high speed highway use. For the above reasons, the towing structure of Walker has not gained wide use in industry.

A more recent alternative solution has been proposed where the forklift is not towed by the trailer, but instead, is fully lifted and mounted to the end of the trailer using the lift features of the forklift itself. For instance, U.S. Pat. Nos. 5,575,604, 5,813,820 and 6,024,535 all to Dubosh et al. discloses an apparatus and method for mounting a forklift on a carrier by lifting the forklift on to the end of the trailer using the forks of the forklift. Dubosh et al. discloses that the apparatus includes crossbars provided on the frame of the forklift that engages pivotal latches provided on the trailer. In use, the mast of the forklift is first advanced slightly and the carriage is raised to a level so that the forks are aligned with the pockets provided on the trailer. The forklift is then moved toward the trailer so that the forks are received within the pockets. The carriage of the forklift is then lowered on the mast thereby lifting the forklift from the ground into a position where the bars are above the pivotal latches. The mast is then retracted so that the crossbars on the frame of the forklift are directly over the latches and the carriage is then raised causing the forklift to be lowered until the crossbars engage the latches of the trailer. The invention of Dubosh has been found to provide secure mounting of the forklift to the end of the trailer without reducing the capacity for transporting pallets of products on the bed of the trailer.

In use however, various limitations and disadvantages of the apparatus of Dubosh has been found by the present applicant. In particular, it has been found that the apparatus of Dubosh is somewhat cumbersome and difficult to use. In particular, because the forks are pivotable (tiltable) with the mast and also vertically displaceable within the mast, the operator mounting the forklift to the trailer must manipulate both of these mechanisms to properly align the bars on the frame of the forklift to the latches on the trailer. Because of the degrees of relative motion possible, such alignment is difficult to attain quickly and consistently. In addition, another disadvantage in the apparatus of Dubosh is that during the mounting procedure, the forks must be advanced a relatively large distance causing large stresses and strains on the various components of the lift and advancing mechanisms as they support the weight of the forklift in this extended position, at least until the carriage is retracted. Furthermore, because the latches are provided on the frame of the forklift, concentrated forces caused by the weight of the forklift and hydraulically induced forces are exerted on the frame at this mounting location. This can eventually cause damage to the frame or even cause failure of the frame. Moreover, the latches provided on the end of the trailer requires the corresponding bars to be positioned at a particular location on the frame of the forklift so that the forklift will be in proper orientation when it is mounted for transport. This limits the variety of forklifts that can be mounted to a particular trailer since the geometric and angular shape of the frame on each forklift differs. Thus, the trailer and the forklift must then be used as a matched pair severely limiting the utility of the trailer. Lastly, such prior art mounting systems can not be readily used in a variety of carrier vehicles because the extension of the beds relative to the frame (i.e. extension of the bed beyond the frame) also varies widely between carrier vehicles.

Therefore, there still exists a need for a mounting system for mounting a vehicle mounted forklift on a carrier vehicle such as a trailer which will avoid the disadvantages of the prior art mounting systems. In particular, there still exists a need for such a mounting system that will be easier to use so that mounting can occur more quickly and consistently. In addition, there exists a need for such a mounting system that will minimize the distance the forks must be advanced so that the stresses and strains on the various components of the lift and advancing mechanisms can correspondingly be minimized. Furthermore, there still exists a need for such a mounting system that will minimize the forces exerted on the frame of the forklift. Moreover, there exists a need for such a mounting system which can be used with a variety of forklifts thereby increasing the utility of the trailer. Lastly, there still exists a need for such a mounting system which can be used with a variety of carrier vehicles.

BRIEF SUMMARY OF THE INVENTION

In view of the foregoing, it is an object of the present invention to provide an improved mounting system for mounting a vehicle mounted forklift on a carrier vehicle such as a trailer that will be easier to mount than the prior art mounting systems.

A second object of the present invention is to provide such a mounting system that will minimize the distance the forks must be advanced during mounting so that the stresses and strains on the various components of the lift and advancing mechanisms can also be minimized.

Yet another object of the present invention is to provide such a mounting system that will minimize the forces exerted on the frame of the forklift.

A fourth, it is an object of the present invention to provide such a mounting system which can be used with a variety of forklifts thereby increasing the utility of the trailer.

Still further, it is an object of the present invention to provide such a mounting system which can be used with a variety of carrier vehicles.

In accordance with the present invention, these objects are obtained by an improved mounting system for mounting a forklift on a carrier vehicle where the forklift includes a frame, a mast connected to the frame, and a fork carriage having a pair of forks extending therefrom. The fork carriage is adapted to be vertically displaceable on the mast and laterally extendable relative to the mast as well. The carrier vehicle for mounting the forklift includes a mounting end with at least one fork receiver adapted to receive the pair of forks therein and to allow complete lifting of the forklift off of a ground surface by vertically displacing the fork carriage. In accordance with the present invention, at least one hook is attached to either the mast of the forklift or the mounting end of the carrier vehicle, and an engagement bar is secured to the other of the mast or the mounting end. The engagement bar is sized to be received within the at least one hook to thereby securely mount the forklift to the mounting end of the carrier vehicle.

In one preferred embodiment of the present invention, the mast includes base portions which are pivotally attached to the frame of the forklift. Preferably, the at least one hook is two hooks rigidly attached to the base portions of the mast, the two hooks being open downwardly. In addition, the engagement bar is secured to the mounting end of the carrier vehicle. In this regard, in accordance with the preferred embodiment, the engagement bar is adapted to be laterally extendable from the mounting end. Preferably, the engagement bar is attached to a pair of horizontal members which are slidingly received within a pair of slot compartments that are attached to the mounting end of the carrier vehicle. In addition, the pair of horizontal members and the pair of slot compartments include at least one through hole adapted to receive a locking means for securing the horizontal members within the pair of slot compartments. In one embodiment, the locking means is either a fastener or a pin.

In yet another alternative embodiment of the present invention, the two hooks are secured to the mounting end of the carrier vehicle, and the engagement bar is attached to the base portion of the mast. Like the previous embodiment, the two hooks are adapted to be laterally extendable from the mounting end. In this regard, each of the two hooks are attached to horizontal members which are slidingly received within the slot compartments that are attached to the mounting end of the carrier vehicle. The pair of horizontal members and the pair of slot compartments may include at least one through hole adapted to receive at least one of a fastener and a pin to thereby secure the horizontal members within the slot compartments.

These and other objects, features and advantages of the present invention will become more apparent from the following detailed description of the preferred embodiments of the invention when viewed in conjunction with the accompanying drawings.

DETAILED DESCRIPTION OF THE INVENTION

Figure 1:
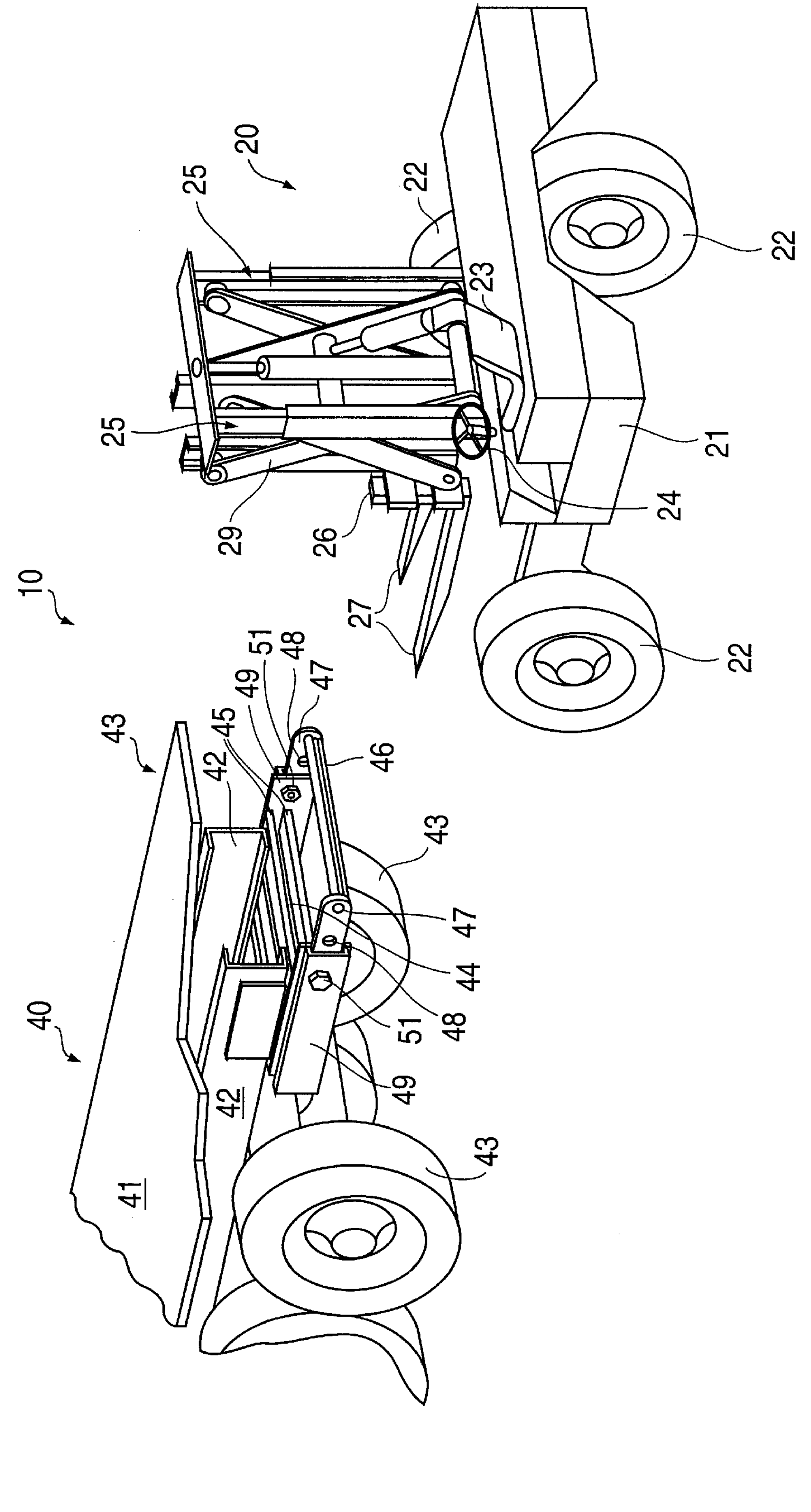
FIG. 1 is a perspective view of a mounting system for mounting a vehicle mounted forklift on a carrier vehicle in accordance with one embodiment of the present invention, the carrier vehicle being shown in a partially sectioned view.

FIG. 1 generally illustrates a mounting system 10 for mounting a vehicle mounted forklift 20 on a carrier vehicle 40 in accordance with one embodiment of the present invention. As will be explained herein below, the mounting system 10 avoids the disadvantages of the prior art mounting systems and is easier to use so that mounting of the forklift 20 on to the carrier vehicle 40 can occur more quickly and consistently. In addition, it will be evident that the mounting system 10 will minimize the stresses and strains on the various components of the forklift 20 and can be used with a variety of forklifts and carrier vehicles.

Figure 2:
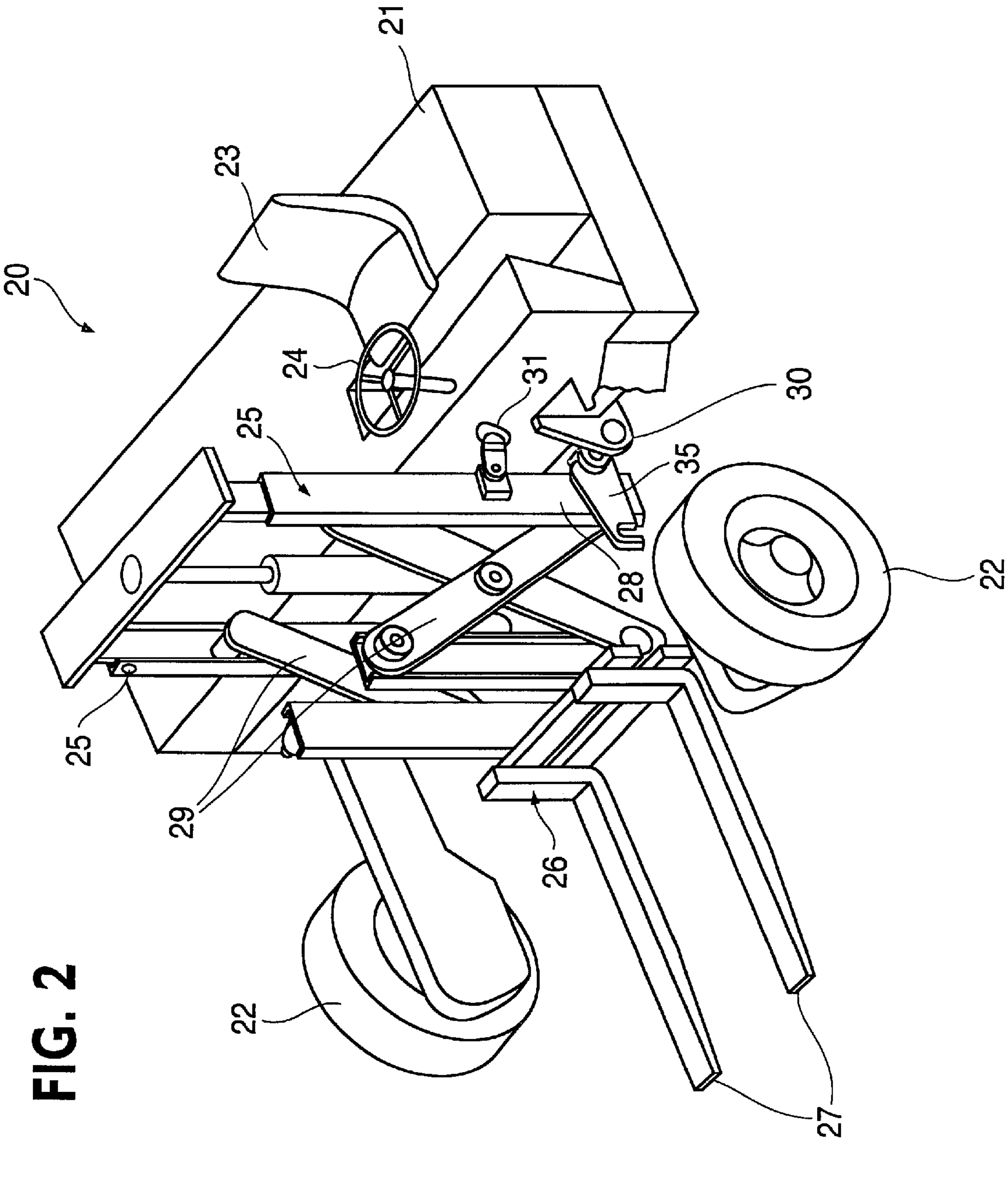
FIG. 2 is a partly sectioned perspective view of the forklift shown in FIG. 1.

As can be seen in FIG. 1 and more clearly in FIG. 2, the forklift 20 for use with the mounting system 10 is a substantially standard forklift having a frame 21 on which various components such as the wheels 22, operator seat 23 and controls 24 are provided. In addition, the forklift 20 includes a mast 25 having base portions 28 which are preferably pivotally connected to the frame 21 via the pivot 30 most clearly shown in FIG. 2. The mast 25 is pivotable by actuation for the pivoting mechanism 31. Moreover, the forklift 20 also includes a fork carriage 26 having a pair of forks 27 extending therefrom. The fork carriage 26 is adapted to be vertically displaceable on the mast 25 to thereby allow lifting of pallets (not shown) as generally known in the art. As can also be seen in the preferred embodiment of FIG. 2, the forklift 20 further includes downwardly open hooks 35 (only one shown) that are rigidly attached to the base portions 28 of the mast 25. As will be explained in further detail below, the hooks 35 are adapted to securely mount the forklift 20 to the carrier vehicle 40.

As can be clearly seen from FIG. 2, the fork carriage 26 of the forklift 20 is also laterally extendable relative to the mast 25 as well as being vertically displaceable as previously noted. Thus, the fork carriage 26 is also laterally extendable relative to the hooks 35 which are rigidly attached to the base portions 28 of the mast 25. This lateral extension of the fork carriage 26 can be attained via a telescoping mechanism (not shown) or a scissor mechanism 29 as known in the art of forklifts or other appropriate mechanisms. It should be made clear that the mounting system 10 in accordance with the present invention is applicable to these types of forklifts where the fork carriage 26 is laterally extendable relative to the mast 25. In this regard, it should be recognized that in many forklifts such as those disclosed in the previously discussed U.S. Pat. No. 4,266,795 to Walker and U.S. Pat. Nos. 5,575,604, 5,813,820 and 6,024,535 all to Dubosh et al., the lateral extension of the fork carriage 26 is attained by the lateral extension of the mast itself. Thus, in these forklifts, lateral extension of the fork carriage relative to the mast would not be possible and the present invention would not be applied.

Figure 3:
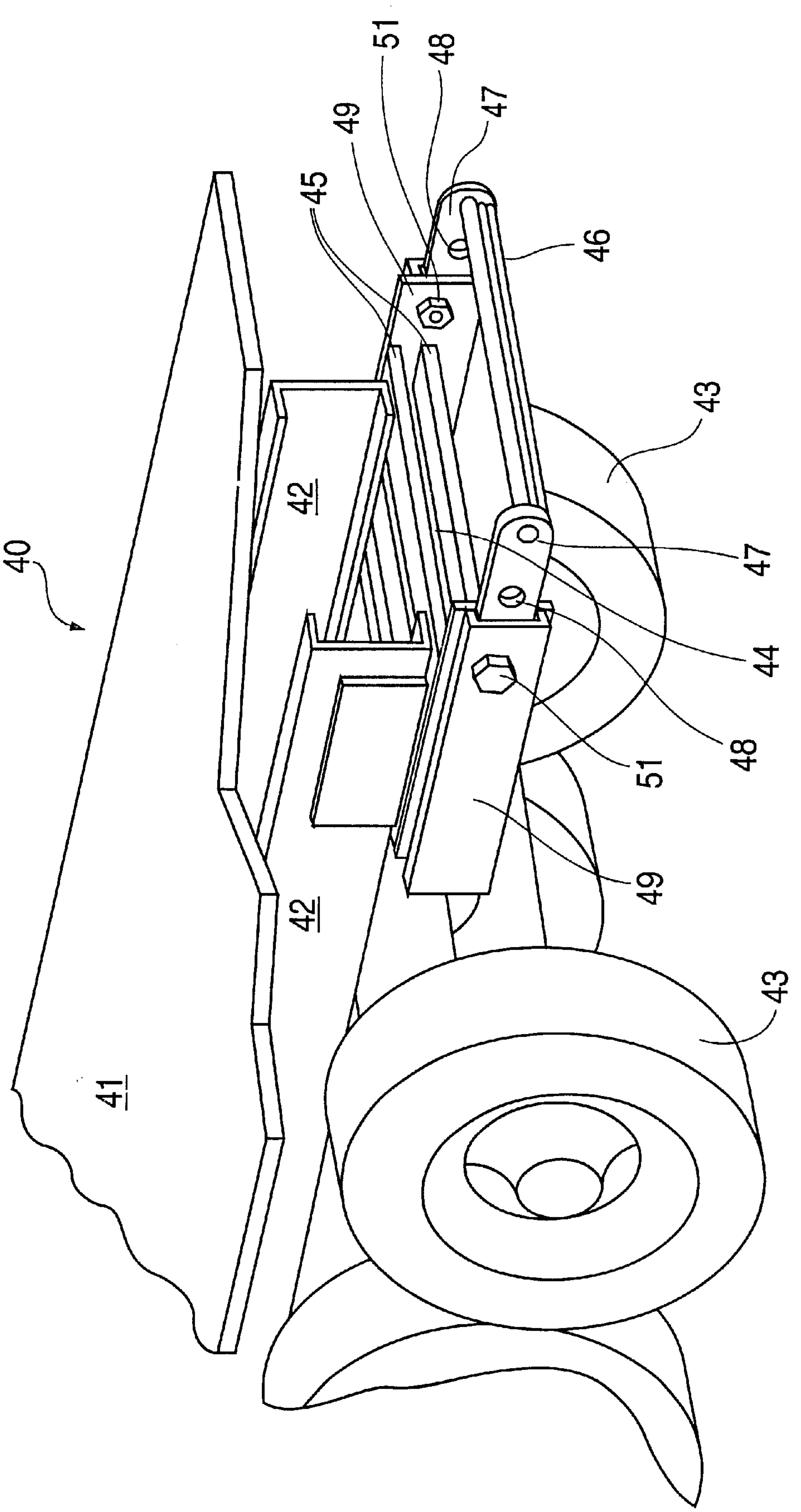
FIG. 3 is an enlarged view of the carrier vehicle of FIG. 1.

FIGS. 1 and 3 clearly show one preferred embodiment of the carrier vehicle 40 for use with the mounting system 10 in accordance with the present invention. The carrier vehicle 40 may be a trailer used in conjunction with a tractor, a flat bed truck or other appropriate vehicle for mounting and transporting the forklift 20 discussed above in a manner further described herein below. In this regard, in the illustrated embodiment, the carrier vehicle 40 includes a flat bed 41 mounted on a vehicle frame 42 with wheels 42 for transporting pallets of products (not shown) as known in he art. The carrier vehicle 40 has a mounting end 43 with at least one fork receiver 44, which in the illustrated embodiments, is formed by lateral members 45 that are positioned at a vertical spaced distance from one another so that the fork receiver 44 has a slot like shape. The fork receiver 44 is adapted to receive the pair of forks 27 of the forklift 20 therein and to allow complete lifting of the forklift 20 off of the ground surface by vertically displacing the fork carriage 26 as will be discussed in further detail below. In accordance with the illustrated embodiment of the present invention, an engagement bar 46 is attached to the mounting end 43 of the carrier vehicle 40, the engagement bar 46 being sized to be received within the hooks 35 of the forklift 20 thereby allowing the secure mounting of the forklift 20 on to the mounting end 43 of the carrier vehicle 40.

In the preferred embodiment of the present invention, the engagement bar 43 is adapted to be laterally extendable and retractable from the mounting end 43 of the carrier vehicle 40. In this regard, the engagement bar 43 is preferably attached to a pair of horizontal members 47 which are slidingly received within a pair of slot compartments 49. The pair of slot compartments 49 are attached to the vehicle frame 42 toward the mounting end 43 of the carrier vehicle 40. In this regard, the pair of slot compartments 49 may be welded to the vehicle frame 42. Preferably, the pair of horizontal members 47 include a plurality of through holes 48 (only one shown, others being hidden within the slot compartments 49) that are positioned along the length of each of the horizontal members 47. One set of the plurality of through holes 48 are aligned to a through hole (not shown) provided on each of the slot compartments 49 and a locking means such as a pin (not shown) or a fastener 51 is inserted through the holes of each of the slot compartments 49 and the horizontal members 47 thereby securing the horizontal members 47 within the pair of slot compartments 49. It should be evident to one skilled in the art that the positioning of the engagement bar 43 is determined by the selection of the through holes 48 of the horizontal members 47 which is aligned with the through hole of the slot compartments 49. Thus, the position of the engagement bar 43 may be adjusted by selecting which of the plurality of through holes 48 positioned along the length of the horizontal members 47 are fastened to the slot compartments 49 with the fastener 51.

Figure 4:
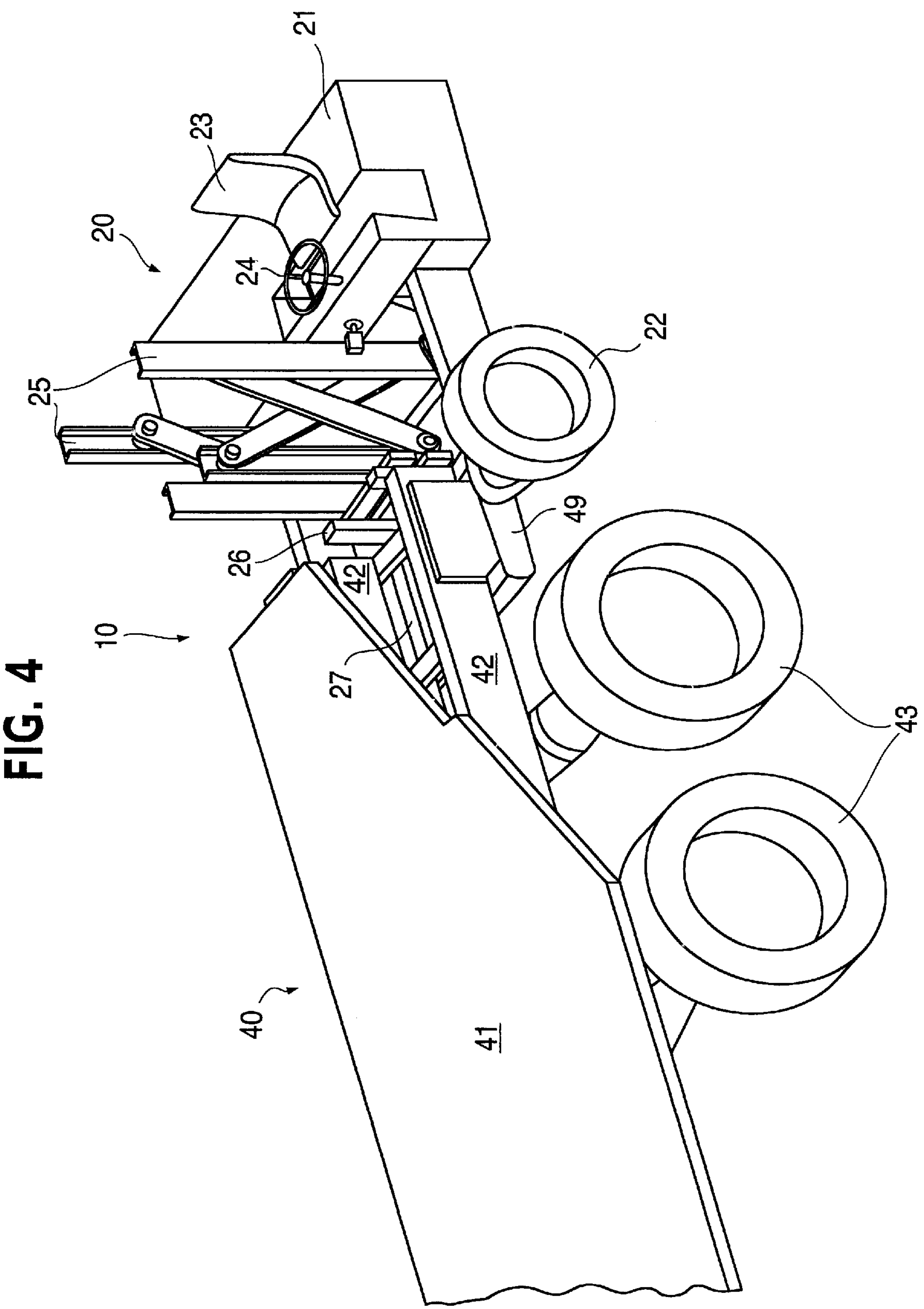
FIG. 4 is a perspective view of the mounting system for mounting a vehicle mounted forklift on a carrier vehicle of FIG. 1, the forklift being mounted to the carrier vehicle.
Figure 5:
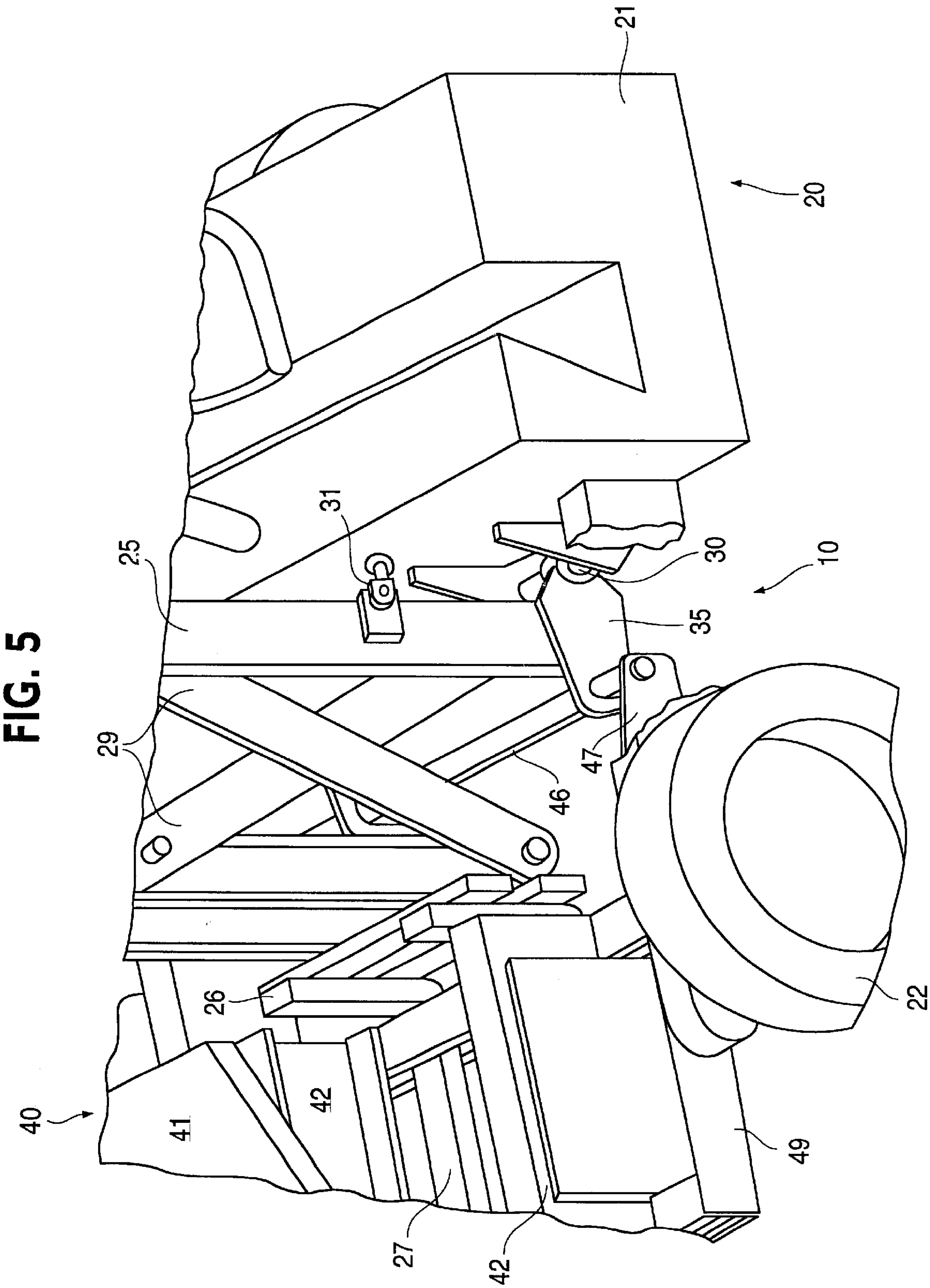
FIG. 5 is an enlarged view of the mounting system in accordance with the preferred embodiment of the present invention.

FIGS. 1, 4 and 5 clearly show the operation of the mounting system 10 in accordance with the preferred embodiment of the present invention. Initially, the forklift 20 is positioned behind the mounting end 43 of the carrier vehicle 40. The fork carriage 26 is raised so that the pair of forks 27 are vertically aligned with the fork receiver 44 formed by the lateral members 45. In addition, the fork carriage 26 is laterally extended relative to the mast 25, preferably about 4 inches to 6 inches, using the scissor mechanism 29. The forklift 20 is then driven forward so that the pair of forks 27 are received within the fork receiver 44. The fork carriage 26 is then lowered within the mast 25 thereby causing the forklift 20 to be fully raised off the ground surface. The forklift 20 is raised until the hooks 35 mounted on the base portions 28 are elevated higher than the engagement bar 43. The fork carriage 26 is then retracted so that the downwardly open hooks 35 are positioned directly over the engagement bar 46. The fork carriage 26 is then raised within the mast 25 thereby lowering the forklift 20 so that the hooks 35 engage the engagement bar 46. The engagement of the hooks 35 on the engagement bar 46 securely mounts the forklift 20 on the mounting end 43 of the carrier vehicle 40.

There are many advantages to the above described embodiment of the present invention as compared to the prior art mounting systems. For instance, because the hooks 35 are rigidly mounted to the base portions 28 of the mast 25 itself in the present mounting system 10, the operator mounting the forklift 20 need not manipulate the mechanisms for pivoting the mast 25 as required in the prior art mounting systems where the hooks are provided on the frame of the forklift. Accordingly, the mounting system 10 in accordance with the present invention effectively eliminates one degree of relative motion possible by the frame of the forklift. This allows facilitated alignment of the hooks 35 and the engagement rod 46 so that mounting of the forklift 20 is attained quickly and consistently. In addition, because the hooks 35 are rigidly mounted to the base portions 28 of the mast 25 itself, the forks 27 and the fork carriage 26 need not be advanced very far from the mast 25 in order to mount the forklift 20. Thus, the present mounting system 10 minimizes stresses and strains on the various components of the lift and advancing mechanisms as they support the weight of the forklift in the extended position during mounting of the forklift 20. Furthermore, because the hooks 35 are rigidly mounted to the base portions 28 of the mast 25, the concentrated forces caused by the weight of the forklift 20 and hydraulically induced forces are exerted directly on the mast 25 which is the strongest and most durable component of the forklift 20. This prevents any possible damage to the frame 21 by such forces. Moreover, by providing rigidly mounted hooks 35 on the base portions 28 of the mast 25 which are substantially common to all forklifts, the present mounting system 10 does not rely upon geometry of the forklift's frame which can vary widely. Furthermore, the adjustable features of the preferred embodiment of the engagement bar 46 also facilitate use of the present mounting system 10 with wide variety of forklifts having a fork carriage which is laterally extendable relative to the mast. Lastly, the adjustable features of the engagement bar 46 further allows the mounting system 10 to be used in a variety of carrier vehicles in which the extension of the flat bed 41 relative to the vehicle frame 42 varies widely. In particular, if the flat bed 41 extends out far from the vehicle frame 42, the engagement bar 46 can be correspondingly extended so that proper engagement of the hooks 35 can be attained. In this manner, in contrast with the systems of the prior art, the mounting system 10 in accordance with the present invention can be used in a variety of carrier vehicles thereby minimizing the need for mounting systems that are customized to be used in a particular carrier vehicle and/or forklift.

Figure 6:
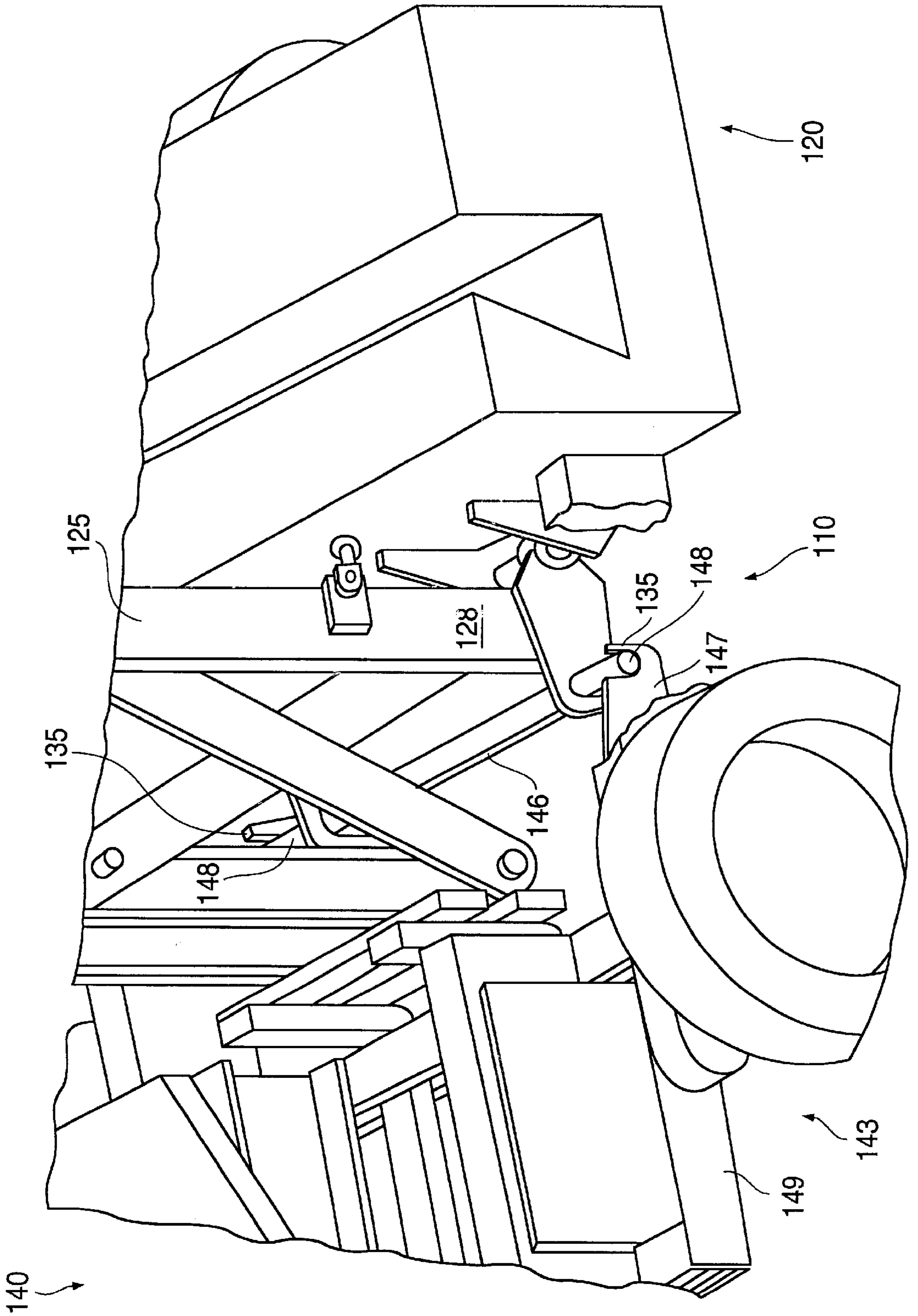
FIG. 6 is an enlarged view of the mounting system in accordance with another preferred embodiment of the present invention.

It should also be noted that in yet another alternative embodiment of the present invention as shown in FIG. 6, the two hooks 135 of the mounting system 110 for mounting the forklift 120 may instead be secured to the mounting end 143 of the carrier vehicle 140, only the components required for full understanding of the embodiment shown and discussed to avoid repetition. An alternative embodiment of the engagement bar 146 may be attached to the base portions 128 of the mast 125. In such an embodiment, the engagement bar 146 may be provided with two shortened engagement bars 148, one at each of the base portions 128 of the mast 125 to engage the hooks in a manner similar to that discussed above. In addition, like the previous embodiment, the two hooks can be attached to the horizontal members 147 which are slidingly received within the slot compartments 149 so that the hooks 135 are also laterally extendable from the mounting end 143 of the carrier vehicle 140.

From the foregoing, it should now be apparent how the present invention provides an improved mounting system which avoids the disadvantages of the prior art mounting systems and is easier to use so that mounting of the forklift on to the carrier vehicle can occur more quickly and consistently. Furthermore, it can be seen how the present invention provides a mounting system that minimizes the stresses and strains on the various components of the forklift and is useable with a variety of forklifts and carrier vehicles.

While various embodiments in accordance with the present invention have been shown and described, it is understood that the invention is not limited thereto. These embodiments may be changed, modified and further applied by those skilled in the art. Therefore, this invention is not limited to the details shown and described previously but also includes all such changes and modifications which are encompassed by the appended claims.

What is claimed is:

1. A mounting system for mounting a forklift on a carrier vehicle comprising:

a forklift having a frame, a mast pivotably connected to said frame, and a fork carriage having at least a pair of forks extending therefrom, said fork carriage being adapted to be vertically displaceable on said mast and laterally extendable relative to said mast;

a carrier vehicle having a mounting end with at least one fork receiver adapted to receive said at least a pair of forks therein and to allow complete lifting of said forklift off of a ground surface by vertically displacing said fork carriage;

at least one hook non-pivotably attached to one of said mast of said forklift and said mounting end of said carrier vehicle; and an engagement bar non-pivotably secured to the other of said mast of said forklift and said mounting end of said carrier vehicle, said engagement bar being sized to be received within said at least one hook to thereby securely mount said forklift to said mounting end of said carrier vehicle.

2. The mounting system for mounting a forklift on a carrier vehicle of claim 1, wherein said mast includes base portions which are pivotally attached to said frame.

3. The mounting system for mounting a forklift on a carrier vehicle of claim 2, wherein said at least one hook is rigidly attached to said base portions of said mast, and said engagement bar is secured to said mounting end of said carrier vehicle.

4. The mounting system for mounting a forklift on a carrier vehicle of claim 3, wherein said at least one hook is two hooks rigidly attached to said base portions of said mast, said two hooks being open downwardly.

5. The mounting system for mounting a forklift on a carrier vehicle of claim 4, wherein said engagement bar is adapted to be laterally extendable from said mounting end.

6. The mounting system for mounting a forklift on a carrier vehicle of claim 5, wherein said engagement bar is attached to a pair of horizontal members which are slidingly received within a pair of slot compartments that are attached to said mounting end of said carrier vehicle.

7. The mounting system for mounting a forklift on a carrier vehicle of claim 6, wherein said pair of horizontal members and said pair of slot compartments include at least one through hole adapted to receive at least one of a fastener and a pin to thereby secure said horizontal members within said pair of slot compartments.

8. The mounting system for mounting a forklift on a carrier vehicle of claim 1, wherein said engagement bar is adapted to be laterally extendable from said mounting end.

9. The mounting system for mounting a forklift on a carrier vehicle of claim 8, wherein said engagement bar is attached to a pair of horizontal members which are slidingly received within a pair of slot compartments that are attached to said mounting end of said carrier vehicle.

10. The mounting system for mounting a forklift on a carrier vehicle of claim 9, wherein said pair of horizontal members and said pair of slot compartments include at least one through hole adapted to receive a locking means for securing said horizontal members within said pair of slot compartments.

11. The mounting system for mounting a forklift on a carrier vehicle of claim 10, wherein said locking means is at least one of a fastener and a pin.

12. The mounting system for mounting a forklift on a carrier vehicle of claim 2, wherein said at least one hook is two hooks secured to said mounting end of said carrier vehicle, and said engagement bar is attached to said base portion of said mast.

13. The mounting system for mounting a forklift on a carrier vehicle of claim 12, wherein said two hooks are adapted to be laterally extendable from said mounting end.

14. The mounting system for mounting a forklift on a carrier vehicle of claim 13, wherein said two hooks are attached to a pair of horizontal members which are slidingly received within a pair of slot compartments that are attached to said mounting end of said carrier vehicle.

15. The mounting system for mounting a forklift on a carrier vehicle of claim 14, wherein said pair of horizontal members and said pair of slot compartments include at least one through hole adapted to receive at least one of a fastener and a pin to thereby secure said horizontal members within said pair of slot compartments.

16. A forklift adapted to be securely mounted to a carrier vehicle, said forklift comprising:

a frame;

a mast with base portions which are pivotally attached to said frame;

a fork carriage having at least a pair of forks extending therefrom, said fork carriage being adapted to be vertically displaceable on said mast and laterally extendable relative to said mast; and at least one of a pair of hooks and a pair of engagement bars fixedly attached to said base portions of said mast for mounting said forklift to said carrier vehicle.

17. A mounting system for mounting a forklift on a carrier vehicle comprising:

a forklift having a frame, a mast pivotably connected to said frame, and a fork carriage having at least a pair of forks extending therefrom, said fork carriage being adapted to be vertically displaceable on said mast and laterally extendable relative to said mast;

a carrier vehicle having a mounting end with at least one fork receiver adapted to receive said at least a pair of forks therein and to allow complete lifting of said forklift off of a ground surface by vertically displacing said fork carriage;

at least one hook fixedly attached to said mast of said forklift; and an engagement bar secured to said mounting end of said carrier vehicle, said engagement bar being sized to be received within said at least one hook to thereby securely mount said forklift to said mounting end of said carrier vehicle.

18. A mounting system for mounting a forklift on a carrier vehicle comprising:

a forklift having a frame, a mast pivotably connected to said frame, and a fork carriage having at least a pair of forks extending therefrom, said fork carriage being adapted to be vertically displaceable on said mast and laterally extendable relative to said mast;

a carrier vehicle having a mounting end with at least one fork receiver adapted to receive said at least a pair of forks therein and to allow complete lifting of said forklift off of a ground surface by vertically displacing said fork carriage;

at least one hook attached to said mounting end of said carrier vehicle; and an engagement bar fixedly secured to said mast of said forklift, said engagement bar being sized to be received within said at least one hook to thereby securely mount said forklift to said mounting end of said carrier vehicle.

* * * * *